(12) United States Patent
Correia et al.

(10) Patent No.: US 11,009,602 B2
(45) Date of Patent: May 18, 2021

(54) METHOD AND SYSTEM FOR ENVIRONMENT DETECTION

(71) Applicant: AUDI AG, Ingolstadt (DE)

(72) Inventors: Pedro Sebastiao Correia, Pförring (DE); Paul Spannaus, Ingolstadt (DE)

(73) Assignee: Audi AG, Ingolstadt (DE)

( * ) Notice: Subject to any disclaimer, the term of this patent is extended or adjusted under 35 U.S.C. 154(b) by 363 days.

(21) Appl. No.: 15/909,510

(22) Filed: Mar. 1, 2018

(65) Prior Publication Data

US 2018/0259640 A1 Sep. 13, 2018

(30) Foreign Application Priority Data

Mar. 8, 2017 (DE) .......................... 102017203838.1

(51) Int. Cl.
*G01S 13/93* (2020.01)
*G01S 13/931* (2020.01)
(Continued)

(52) U.S. Cl.
CPC ............ *G01S 13/931* (2013.01); *B60W 30/17* (2013.01); *G01S 7/003* (2013.01); *G01S 13/46* (2013.01);
(Continued)

(58) Field of Classification Search
CPC .......... G01S 13/93; G01S 17/93; G01S 15/46; G01S 13/46; G01S 15/931; G01S 17/87;
(Continued)

(56) References Cited

U.S. PATENT DOCUMENTS 8,126,642 B2 2/2012 Trepagnier et al.
8,457,827 B1 6/2013 Ferguson et al.
(Continued)

FOREIGN PATENT DOCUMENTS

CN 104133473 A 11/2014
CN 104271420 A 1/2015
(Continued)

OTHER PUBLICATIONS

English-language abstract for German patent DE 102014104574 A1, published Oct. 1, 2015; 1 page.
(Continued)

*Primary Examiner* — Jonathan M Dager
*Assistant Examiner* — Jean W Charleston
(74) *Attorney, Agent, or Firm* — Sterne, Kessler, Goldstein & Fox P.L.L.C.

(57) ABSTRACT

Disclosed are methods and systems for environment detection in which a first vehicle detects its vehicle environment with at least one sensor, wherein the first vehicle transmits sensor data of the sensor pertaining to its vehicle environment to an off-board server device; at least one second vehicle with at least one sensor transmits sensor data of the sensor pertaining to its vehicle environment to the off-board server device; the off-board server device merges the transmitted sensor data of the vehicles and generates an environmental model of the vehicle environment of the first vehicle on the basis thereof; the environmental model that is generated is subsequently transmitted by the off-board server device to the first vehicle.

14 Claims, 2 Drawing Sheets

(51) Int. Cl.
  *G01S 15/46* (2006.01)
  *G01S 13/46* (2006.01)
  *G01S 15/931* (2020.01)
  *G01S 17/87* (2020.01)
  *G01S 7/00* (2006.01)
  *G01S 17/931* (2020.01)
  *B60W 30/17* (2020.01)

(52) U.S. Cl.
  CPC .......... *G01S 15/46* (2013.01); *G01S 15/931* (2013.01); *G01S 17/87* (2013.01); *G01S 17/931* (2020.01); *B60W 2554/4041* (2020.02); *B60W 2554/801* (2020.02); *B60W 2554/804* (2020.02); *B60W 2556/50* (2020.02); *B60W 2556/65* (2020.02); *G01S 2013/462* (2013.01); *G01S 2013/464* (2013.01); *G01S 2013/9316* (2020.01); *G01S 2013/9323* (2020.01); *G01S 2013/9324* (2020.01); *G01S 2013/93271* (2020.01)

(58) Field of Classification Search
  CPC ............ G01S 7/003; G01S 2013/9316; G01S 2013/9323; G01S 2013/9324; G01S 2013/93271; G01S 2013/464; G01S 2013/462; B60W 30/17; B60W 2554/801; B60W 2554/804; B60W 2554/4041; B60W 2556/50; B60W 2556/65; B60W 40/02; B60W 40/04; B60W 2555/20
  USPC .......................................................... 701/96
  See application file for complete search history.

(56) References Cited

U.S. PATENT DOCUMENTS

| | | | |
|---|---|---|---|
| 9,008,890 B1* | 4/2015 | Herbach | G05D 1/0214 |
| | | | 701/26 |
| 9,360,328 B2 | 6/2016 | You et al. | |
| 9,495,874 B1* | 11/2016 | Zhu | G06K 9/00805 |
| 2005/0060117 A1* | 3/2005 | Kunzler | G01S 13/931 |
| | | | 702/149 |
| 2010/0045482 A1* | 2/2010 | Strauss | G08G 1/163 |
| | | | 340/903 |
| 2010/0174451 A1 | 7/2010 | Leinung | |
| 2011/0010094 A1* | 1/2011 | Simon | G08G 1/167 |
| | | | 701/301 |
| 2012/0053755 A1 | 3/2012 | Takagi | |
| 2013/0054106 A1* | 2/2013 | Schmudderich | G06K 9/6293 |
| | | | 701/96 |
| 2015/0158486 A1 | 6/2015 | Healey et al. | |
| 2015/0355637 A1 | 12/2015 | Morisset | |
| 2016/0009296 A1 | 1/2016 | Iguchi et al. | |
| 2016/0061935 A1* | 3/2016 | McCloskey | G01S 13/345 |
| | | | 342/82 |
| 2016/0112841 A1 | 4/2016 | Holland | |
| 2016/0278153 A1* | 9/2016 | Kim | H01Q 3/34 |
| 2016/0314691 A1* | 10/2016 | Esswein | G08G 1/096811 |
| 2016/0330394 A1* | 11/2016 | Shahraray | H04W 4/70 |
| 2017/0229019 A1* | 8/2017 | Ichinose | G01S 13/878 |
| 2017/0277188 A1* | 9/2017 | Xu | G05D 1/0246 |
| 2018/0172814 A1* | 6/2018 | Okazaki | G01S 13/04 |
| 2019/0156668 A1 | 5/2019 | Liang et al. | |

FOREIGN PATENT DOCUMENTS

| | | | | |
|---|---|---|---|---|
| CN | 104990554 A | 10/2015 | | |
| CN | 105109484 A | 12/2015 | | |
| CN | 105705395 A | 6/2016 | | |
| CN | 105759295 A | 7/2016 | | |
| CN | 106128140 A | 11/2016 | | |
| DE | 102009006113 A | 9/2009 | | |
| DE | 102009002870 A1 | 11/2010 | | |
| DE | 102014002113 A1 | 8/2015 | | |
| DE | 102014002114 A1 | 8/2015 | | |
| DE | 102014002116 A1 | 8/2015 | | |
| DE | 102014104574 A1 | 10/2015 | | |
| DE | 102014213171 A1 | 10/2015 | | |
| DE | 102015001757 A1 * | 8/2016 | ........... G08G 1/0141 | |
| DE | 102015218455 A1 * | 3/2017 | ......... G06K 9/00805 | |
| DE | 102016220581 A1 * | 4/2018 | ........... B60W 40/02 | |
| WO | WO 2015/093823 A1 | 6/2015 | | |

OTHER PUBLICATIONS

English-language abstract for German patent DE 102014213171 A1, published Oct. 15, 2015; 1 page.

* cited by examiner

METHOD AND SYSTEM FOR ENVIRONMENT DETECTION

TECHNICAL FIELD

This disclosure relates to a method and a system for environment detection of a motor vehicle.

BACKGROUND

It is inherently known to use sensors in a vehicle to perform environment detection in automobiles. For example, cameras, radar sensors, LiDAR systems, ultrasonic and/or infrared sensors are used to obtain information about a vehicle environment. Such sensors are usually based on radiant scanning of the environment. Road boundaries and/or other road users can result in interreflections. Such interreflections are usually interpreted as a source of interference and filtered out of sensor data in a highly complex data evaluation. The elimination of such reflection effects from the information from ambient sensors not only prevents misinterpretations—so-called ghost objects—but also eliminates the possibility of a targeted exploitation of the detection of concealed objects.

DE 10 2014 002 114 A1 describes a method in which a transverse intervention or a longitudinal intervention in an automobile occurs as a function of a detected line of vehicles traveling ahead. Among other things, a road user that is concealed by a vehicle traveling directly ahead is detected by means of the vehicle's radar sensors. This is achieved by evaluating radar signals reflected by the concealed road user and by the ground. In addition, vehicle-to-vehicle communication is also used to obtain information about the line of vehicles, such as the movement profile, for example.

DE 10 2014 002 113 A1 describes a method in which an automatic driving intervention in a vehicle occurs as a function of a detected line of vehicles traveling ahead. Among other things, a road user that is concealed by a vehicle traveling directly ahead is detected by means of the vehicle's radar sensors. This is achieved by evaluating radar signals reflected by the concealed road user and by the ground. In addition, a statistical evaluation is performed on the traffic lane information of many vehicles. To do this, speed and acceleration profiles of many vehicles that had already traveled in the lane currently being traveled in by the vehicle are evaluated by means of a server and used as behavioral benchmarks. Such deviations between the line of vehicles traveling ahead and the behavioral benchmarks serve as indicators of an unusual traffic situation.

DE 10 2009 002 870 A1 discloses a method in which objects are detected by means of ultrasonic sensors of an automobile.

In particular, when interreflections of sensor signals are evaluated to detect a vehicle environment and thereby identify concealed road users, above all, the danger exists that misinterpretations will occur in relation to objects that are putatively detected in the vehicle environment. Especially if sensor data pertaining to the vehicle environment are used for autonomous longitudinal and/or transverse guidance of automobiles, it is especially important that the vehicle environment be detected as correctly as possible.

DE 10 2014 104 574 A1 describes a method for performing special transport by means of a special transport vehicle. Other vehicles send data regarding their surroundings to a centralized infrastructure. There, the data are merged and made available to the special transport.

DE 10 2014 002 116 A1 describes a method for operating a driver assistance system by means of which a driver is supported during a passing operation. Using radar sensors, a line of vehicles traveling ahead is analyzed by exploiting interreflections. Information about the line of vehicles traveling ahead is made available to the driver as support for the passing operation.

DE 10 2014 213 171 A1 describes a system for the autonomous guidance of an automobile. Among other things, driving dynamic data of other vehicles—particularly of those traveling ahead, approaching, or traveling to the side—with which travel in a convoy can be made possible are analyzed. A convoy can be achieved on a motorway in this way, so that the vehicle integrates into the flow of traffic and no interventions are required on the driver's part.

BRIEF DESCRIPTION OF THE DRAWINGS/FIGURES

The accompanying drawings are incorporated herein and form a part of the specification.

In the drawings, like reference numbers generally indicate identical or similar elements.

DETAILED DESCRIPTION

Figure 1:
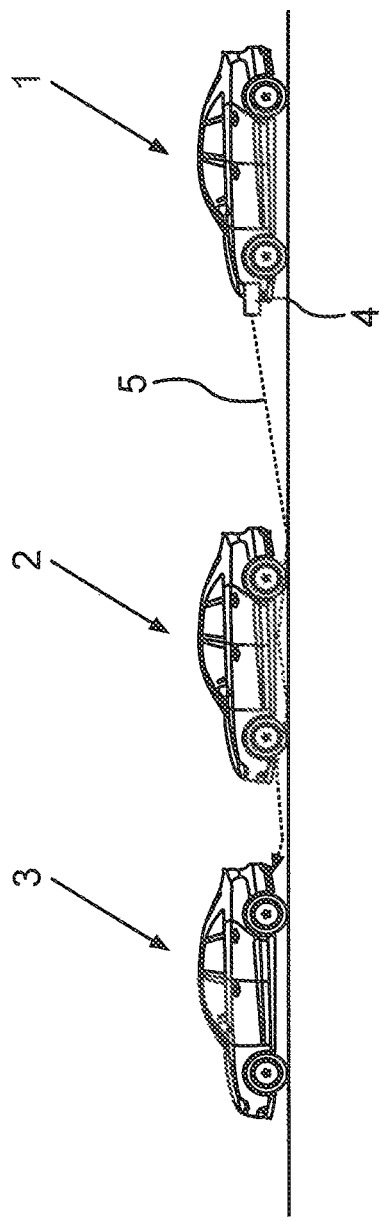
FIG. 1 shows a side view of three vehicles that are traveling one after another, with the rearmost vehicle being detected by means of a sensor of the frontmost vehicle, according to some embodiments.

It is the object of this disclosure to provide methods and systems for environment detection by means of which at least one vehicle environment of at least one vehicle can be detected in an especially reliable and error-free manner.

This object is achieved by embodiments of a method and a system for environment detection with the features of the independent claims. Additional advantageous embodiments with expedient and non-trivial developments are indicated in the dependent claims.

In an embodiment of a method disclosed herein for environment detection, a first vehicle detects its vehicle environment by means of at least one sensor. The embodiment of the method provides that the first vehicle transmits the sensor data of the sensor pertaining to its vehicle environment to an off-board server device. At least one additional vehicle with at least one sensor transmits sensor data of the sensor pertaining to its vehicle to the off-board server device. The off-board server device merges the transmitted sensor data of the vehicles and generates an environmental model of the vehicle environment of the first vehicle on the basis thereof. The environmental model that is generated is subsequently transmitted by the off-board server device to the first vehicle.

In a preferable embodiment of the method disclosed herein for environment detection, the sensor data from a plurality of sensors of different vehicles pertaining to their respective vehicle environment are transmitted to the off-board server device. The off-board server device can then merge the transmitted sensor data of the plurality of vehicles—of an entire fleet of vehicles, for example—and generate and make available, on that basis, an especially exact environmental model of the vehicle environment of one of the vehicles or even of all of the vehicles. The server device comprises one or more high-performance computer(s), so that the plurality of sensor data can be merged quickly to generate, on the basis thereof, the environmental model of the vehicle environment of the first vehicle or also of additional vehicles. The off-board server device thus provides a kind of intersection of all of the sensor data received pertaining to at least one defined vehicle environment, and, through the consideration of the plurality of sensor data of different sensors of different vehicles, it is possible to achieve, with an especially high degree of probability, a flawless representation of one or more vehicle environments in the form of the generated environmental model.

A kind of swarm data function is thus exploited in the method disclosed herein, in that a plurality of vehicles transmit respective sensor data pertaining to their respective vehicle environment to the server device, where they are merged. Through this targeted aggregation of a plurality of sensor data from different vehicles, the visual range of the respective vehicles can be increased substantially with regard to the environmental model that can be made available. It is not only highly precise navigation and map information that constitute crucial basic pillars of piloted driving; rather, the real-time behavior of all road users and their typical movement patterns do as well. By means of the method disclosed herein for environment detection, the real-time behavior of road users can be determined in an especially reliable manner, and typical movement patterns can also be identified on the basis thereof.

The observation of the traffic patterns in the respective vehicle environment is thus given primary emphasis in the method disclosed herein. In embodiments of the method, a kind of statistical model of the lane occupancy in the respective vehicle environment can be prepared, with it being possible for an overall picture of the actual current vehicle environment to be generated by means of the off-board server device in the form of the environmental model. Moreover, the current traffic pattern can be identified and represented in an especially reliable manner over an entire stretch of road over which the respective vehicle is to travel.

What is more, a provision is made that, during the merging of the sensor data, a probability of occurrence of individual objects is determined and only those objects that have a predefined probability of occurrence are considered as a part of the environmental model. This is particularly expedient in relation to the identification of concealed road users. For example, it is possible for one vehicle to detect an object through a direct reflection of a radar signal, whereas another vehicle detects the additional object on the basis of interreflection. Now, if the sensor data of both vehicles are available to the off-board server device, the server device is able to check the plausibility of the detected object that is actually present and thus actually has a high probability of occurrence. Likewise, it is also possible for several vehicles to expect a certain object at a certain position through the evaluation of interreflections. If this is confirmed by the off-board server device, then the probability of occurrence of the object is very high. The off-board server device can thus determine the likelihood of whether a concealed object does in fact exist and have specific characteristics—for example, what kind of vehicle it is, its size, how fast it is traveling, what direction it is moving in, and the like.

One advantageous embodiment of this disclosure provides that respective positional data of the vehicles is transmitted together with the sensor data to the server device and considered in the generation of the environmental model. Alternatively or in addition, a provision is preferably made that respective movement data of the vehicles is transmitted together with the sensor data to the server device and considered in the generation of the environmental model. Preferably, data pertaining to respective vehicle positions and vehicle movements are thus also transmitted together with the sensor data to the off-board server device and taken into account and evaluated when the environmental model is prepared. The environmental model can be made to be especially exact through knowledge of the respective vehicle positions and/or knowledge of the respective vehicle movements. In particular, inconsistencies between different sets of sensor data can thus also be resolved and/or considered in a particularly effective manner.

Another advantageous embodiment provides that at least one of the sensors is a radar sensor, a laser scanner, or an ultrasonic sensor by means of which the vehicle environment is detected. In addition, it is also possible for the vehicles to have a plurality of sensors. Different types of sensors, such as radar sensors, laser scanners, or ultrasonic sensors, for example, can also be used. Furthermore, it is also possible, for example, to use LiDAR systems or also camera systems. Preferably, all of the sensor data of the sensors of the various vehicles that are used are transmitted to the off-board server device, so that it is able to perform the merging of the sensor data on the basis of these complete sensor data to prepare the environmental model or even a plurality of environmental models of different vehicle environments on the basis thereof. Particularly if different types of sensors are used for the respective vehicle environment detection and made available to the off-board server device, especially precise environmental models can be produced.

According to another advantageous embodiment, a provision is made that a road user that is concealed by a vehicle that is traveling directly ahead is detected by means of at least one of the sensors through the evaluation of an interreflected sensor signal and transmitted to the server device as part of the sensor data. Besides the evaluation of directly reflected sensor signals, such as radar signals or the like, objects that are identified by interreflection are preferably also taken into account. For example, reflections of radar signals on the roadway surface, on other road users, and/or on roadway boundaries can be taken into account to detect road users that are themselves concealed. Through the merging of sensor data by means of the off-board server device, objects that are evaluated and detected by means of interreflected sensor signals can also be verified and thus also recognized in an especially reliable manner. Preferably, an evaluation is thus performed of signals that are interreflected by the ground, traffic boundaries such as guard rails, oncoming traffic, and also by other vehicles to detect concealed road users.

Another advantageous embodiment provides that a preparation is made in the vehicles for a synchronous convoy startup, particularly after a red light, in consideration of the environmental model. Because the environmental model is generated exactly on the basis of the different sets of sensor data of the different sensors from the different vehicles, a synchronous convoy startup can be controlled in an especially reliable manner by a plurality of vehicles.

In another advantageous embodiment, a provision is made that an automatic longitudinal guidance is controlled as a function of the environmental model in at least one of the vehicles. Because the environmental model can be generated so as to be especially precise, information regarding the real-time behavior of all road users in the vicinity of the vehicle is particularly also available, so the typical movement patterns thereof in the longitudinal guidance of the respective vehicle can also be taken into account. The reliability of automated driving functions can be increased substantially through the especially exact environmental model.

The system disclosed herein for environment detection comprises a first vehicle having at least one sensor for detecting its vehicle environment. This system provides that the first vehicle is configured to transmit the sensor data of the sensor pertaining to its vehicle environment to an off-board server device of the system. Moreover, the system has at least one second vehicle with at least one sensor for detecting its vehicle environment, with the second vehicle being configured to transmit sensor data of the sensor pertaining to its vehicle environment to the server device. In addition, the server device is configured to merge the sensor data transmitted from the vehicles and, on the basis thereof, generate an environmental model of the vehicle environment of the first vehicle and transmit it to the first vehicle. Moreover, the server device is configured to determine the probability of occurrence of individual objects during the merging of the sensor data and to take only those objects into consideration as part of the environmental model that have a predefined probability of occurrence. Advantageous embodiments of the method disclosed herein are to be regarded as being advantageous embodiments of the system disclosed herein and vice versa, with the system particularly having means for carrying out the method steps.

Figure 2:
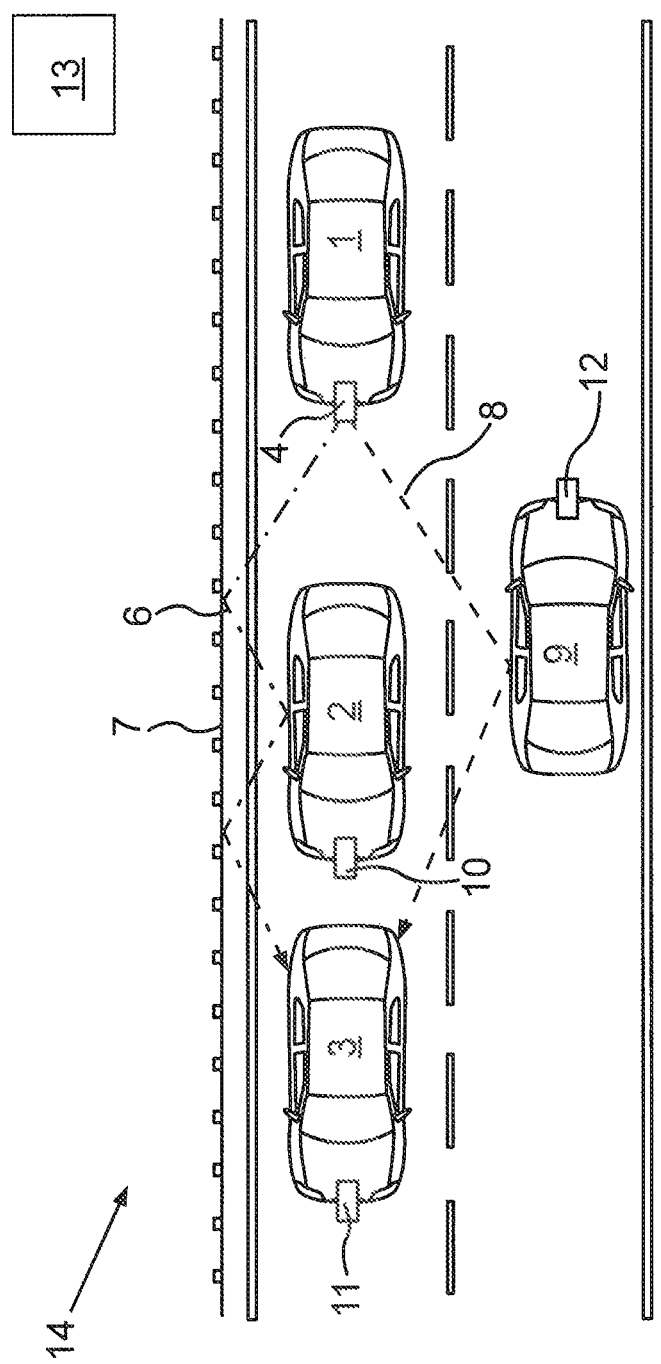
FIG. 2 shows a top view of the three vehicles that are traveling one after another while a fourth vehicle is approaching, with an off-board server device also being indicated schematically by means of which respective sensor data of respective sensors of the vehicles are evaluated, according to some embodiments.

FIG. 1 shows a side view of three vehicles that are traveling one after another, with the rearmost vehicle being detected by means of a sensor of the frontmost vehicle, according to some embodiments; and FIG. 2 shows a top view of the three vehicles that are traveling one after another while a fourth vehicle is approaching, with an off-board server device also being indicated schematically by means of which respective sensor data of respective sensors of the vehicles are evaluated, according to some embodiments.

The three vehicles 1, 2, 3 that are traveling one after another are shown in a side view in FIG. 1. The three vehicles 1, 2, 3 are traveling one after another in the manner of a convoy. The vehicle 1 has a sensor 4, for example, in the form of a radar sensor, by means of which the vehicle 3, which is concealed by the vehicle 2, can be detected. An interreflected sensor signal 5, for example, in the form of an interreflected radar signal, is detected by means of the sensor 4 to thus detect the vehicle 3. The vehicle 2 traveling directly ahead is thus tunneled under by the sensor signal 5. In other words, the sensor signal 5 travels under the vehicle 2 to detect the vehicle 3.

Due to specific characteristics in the incoming sensor signal 5, this tunneling-under can be merged into a concrete image of the traffic ahead—the vehicle 3 in the present example. For example, the time response, the travel time, the frequency spectrum, and the signal attenuation of the incoming sensor signal 5 can be taken into account. Furthermore, the movement of the vehicle 1 itself as well as of the road user that is being tunneled under (the vehicle 2) can also be taken into account.

FIG. 2 shows a top view of the three vehicles 1, 2, 3, with a sensor signal 6 that is received by means of the sensor 4 being characterized in that it travels through interreflection on a guard rail 7 from the vehicle 3 that is traveling ahead to the sensor 4. In addition, a sensor signal 8 travels from the vehicle 3 that is traveling ahead to the sensor 4 through reflection on an oncoming vehicle 9.

The sensor 4 of the vehicle 1 can also detect the vehicle 3 that is concealed by the vehicle 2 through roadway boundaries, for example, in the form of the guard rail 7, and/or through oncoming traffic, in this case, in the form of the oncoming additional vehicle 9. However, the detection of concealed road users is not as reliable as the direct detection of unconcealed road users.

The vehicles 2, 3, 9 each have respective sensors 10, 11, 12. The vehicles 1, 2, 3, 9 can detect their respective vehicle environment by means of the respective sensors 4, 10, 11, 12. Together with an off-board server device 13, the vehicles 1, 2, 3, 9 with their respective sensors 4, 10, 11, 12 form together a system 14 for environment detection. The respective vehicles 1, 2, 3, 9 are configured to transmit sensor data of their sensors 4, 10, 11, 12 pertaining to their respective vehicle environment to the off-board server device 13. The server device 13, in turn, is configured to merge the sensor data transmitted from the different vehicles 1, 2, 3, 9 and, on the basis thereof, generate an environmental model of the vehicle environment of the vehicle 1 and transmit it to the vehicle 1. In the same manner, the server device 13 can generate and transfer respective environmental models of respective vehicle environments for the respective vehicles 2, 3, 9.

The vehicles 1, 2, 3, 9 also transmit their respective own positional data and respective own movement data together with the sensor data to the off-board server device 13. The server device 13 therefore contains not only the sensor data of the respective sensors 4, 10, 11, 12; information and/or data regarding the respective positions and speeds and/or accelerations of the respective vehicles 1, 2, 3, 9 that are to be correlated with respective sensor data are also present. This enables an especially effective merging of sensor data and generation of respective environmental models for the respective vehicle environments of the vehicles 1, 2, 3, 9 to be achieved.

The sensors 4, 10, 11, 12 can be radar sensors, laser scanners, ultrasonic sensors, LiDAR systems, or camera systems, for example. Unlike in the present example, the vehicles 1, 2, 3, 9 can also have a plurality of similar or different sensors, so that sensor data are made available, for example, that enable a kind of 360° detection of the respective vehicle environment of the vehicles 1, 2, 3, 9.

The system 14 is thus configured to receive and evaluate all of the sensor data of the sensors 4, 10, 11, 12 from the different vehicles 1, 2, 3, 9 by means of the off-board server device 13 to thus produce especially exact environmental models for the respective vehicles 1, 2, 3, 9. For example, the vehicles 1, 2, 3, 9 can be controlled partially autonomously or fully autonomously on the basis of the respective generated environmental models.

For example, a fully autonomous startup process for the vehicles 1, 2, 3 after a red light can be initiated. By virtue of the fact that respective sensors 4, 10, 11, 12 provide sensor data pertaining to the respective vehicle environments, the knowledge regarding the traffic pattern in the vicinity of the respective vehicles 1, 2, 3, required for the vehicles 1, 2, 3 to travel in a convoy, can be reproduced in an especially exact manner and taken into account while traveling in the convoy.

The environmental models for the individual vehicles 1, 2, 3, 9 that can be generated by means of the off-board server device 13 can be used and taken into account in the case of automatic longitudinal guidance and/or automatic transverse guidance of the different vehicles 1, 2, 3, 9. Through the merging of the sensor data by means of the off-board server device 13, the visual range of the individual vehicles 1, 2, 3, 9 can be increased substantially, because the sensors of the respective vehicles 1, 2, 3, 9 are not merely used in isolation for the environment detection. In addition, the totality of the sensor data made available by means of the sensors 4, 10, 11, 12 is processed, interpreted, and then made available by means of the off-board server device 13 in the form of especially exact environmental models for respective vehicle environments of the vehicles 1, 2, 3, 9.

The method and system 14 explained with reference to the four vehicles 1, 2, 3, 9 with their sensors 4, 10, 11, 12 is to be understood as being only for the sake of example. The system 14 can also have a multitude of additional vehicles with their respective sensors (not shown here). Sensor data can be transmitted from an entire fleet of vehicles to the server device 13. The server device 13 can then evaluate all of the incoming sensor data in a manner analogous to the procedure described above to generate respective environmental models for the individual vehicles that transmit their sensor data to the server device 13.

The invention claimed is:

1. A method for environment detection by which a first vehicle, having a first sensor, detects a vehicle environment of the first vehicle, wherein the method comprises:
    transmitting, by the first vehicle, sensor data of the first sensor pertaining to the vehicle environment of the first vehicle to an off-board server device;
    transmitting, by a second vehicle with a second sensor, sensor data of the second sensor pertaining to a vehicle environment of the second vehicle to the off-board server device;
    merging, by the off-board server device, the transmitted sensor data of the first vehicle and of the second vehicle into merged sensor data;
    generating, by the off-board server device, an environmental model of the vehicle environment of the first vehicle using the merged sensor data of the first vehicle and of the second vehicle;
    transmitting, by the off-board server device, the environmental model that is generated to the first vehicle; and
    determining, by the off-board server device, during the merging of the sensor data, a probability of occurrence of individual objects detected in the sensor data of the first sensor and the sensor data of the second sensor, wherein the individual objects detected in the sensor data of the first sensor and the sensor data of the second sensor that have a predefined probability of occurrence are considered as a part of the environmental model.

2. The method of claim 1, further comprising:
    transmitting, by the first vehicle and the second vehicle, respective positional data of the first vehicle and of the second vehicle, along with the merged sensor data, to the off-board server device; and
    using, by the off-board server device, the respective positional data of the first vehicle and of the second vehicle, along with the merged sensor data, in the generating of the environmental model.

3. The method of claim 1, further comprising:
    transmitting, by the first vehicle and the second vehicle, respective movement data of the first vehicle and of the second vehicle, along with the merged sensor data, to the off-board server device; and
    using, by the off-board server device, the respective movement data of the first vehicle and of the second vehicle, along with the merged sensor data, in the generating of the environmental model.

4. The method of claim 1, wherein the first sensor of the first vehicle or the second sensor of the second vehicle for the environment detection is at least one of, or a combination of more than one of, a radar sensor, a laser scanner, an ultrasonic sensor, a LiDAR system, and a camera system.

5. The method of claim 1, further comprising:
    detecting of a road user that is concealed by another vehicle that is traveling directly ahead, wherein the detecting comprises:
    evaluating, by the first sensor of the first vehicle or by the second sensor of the second vehicle, an interreflected sensor signal; and
    transmitting, by the first sensor of the first vehicle or by the second sensor of the second vehicle, the interreflected sensor signal as part of the merged sensor data to the off-board server device.

6. The method of claim 1, further comprising:
    using, by the first vehicle and the second vehicle, the environmental model to achieve a synchronous convoy startup.

7. The method of claim 1, further comprising:
    controlling an automatic longitudinal guidance as a function of the environmental model in at least one of the first vehicle and the second vehicle.

8. A system for environment detection, comprising:
    a first vehicle, having a first sensor for detecting a vehicle environment of the first vehicle, wherein the first vehicle is configured to transmit first sensor data of the first sensor of the first vehicle, pertaining to the vehicle environment of the first vehicle, to an off-board server device of the system;
    a second vehicle, having a second sensor for detecting a vehicle environment of the second vehicle, wherein the second vehicle is configured to transmit second sensor data of the second sensor of the second vehicle, pertaining to the vehicle environment of the second vehicle, to the off-board server device; and
    the off-board server device, configured to:
    merge the first sensor data transmitted from the first vehicle and the second sensor data transmitted from the second vehicle into merged sensor data;
    determine, during the merging of the first and second sensor data, a probability of occurrence of individual objects detected in the first sensor data and the second sensor data in the vehicle environment of the first vehicle;
    generate an environmental model of the vehicle environment of the first vehicle based at least in part on the merged sensor data, wherein the environmental model comprises the individual objects detected in the first sensor data and the second sensor data that have a predefined probability of occurrence; and
    transmit the environmental model of the vehicle environment of the first vehicle to the first vehicle.

9. The system of claim 8, wherein the first vehicle and the second vehicle are configured to transmit their respective positional data along with the merged sensor data to the off-board server device, and wherein the off-board server device is configured to use the respective positional data of the first vehicle and of the second vehicle along with the merged sensor data to generate the environmental model.

10. The system of claim 8, wherein the first vehicle and the second vehicle are configured to transmit their respective movement data along with the merged sensor data to the off-board server device, and wherein the off-board server device is configured to use the respective movement data of the first vehicle and of the second vehicle along with the merged sensor data to generate the environmental model.

11. The system of claim 8, wherein the first sensor of the first vehicle or the second sensor of the second vehicle for the environment detection is configured to be at least one of, or a combination of more than one of, a radar sensor, a laser scanner, an ultrasonic sensor, a LiDAR system, and a camera system.

12. The system of claim 8, wherein the system is configured to:
   detect a road user that is concealed by another vehicle that is traveling directly ahead, wherein to detect the road user, the system is further configured to:
   evaluate, by the first sensor of the first vehicle or by the second sensor of the second vehicle, an interreflected sensor signal; and
   transmit, by the first sensor of the first vehicle or the second sensor of the second vehicle, the interreflected sensor signal as part of the merged sensor data to the off-board server device.

13. The system of claim 8, wherein the first vehicle and the second vehicle are configured to use the environmental model to achieve a synchronous convoy startup.

14. The system of claim 8, wherein the system is configured to control an automatic longitudinal guidance as a function of the environmental model in the first vehicle and in the second vehicle.

* * * * *